United States Patent
Groessl (10) Patent No.: US 12,122,610 B2
(45) Date of Patent: Oct. 22, 2024

(54) TRANSFER OF CONVEYING GOOD FROM INERTIA-BASED DELIVERING VEHICLE TO CONTINUOUS CONVEYOR

(71) Applicant: SSI Schäfer Automation GmbH (AT), Graz (AT)

(72) Inventor: Christoph Groessl, Graz (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 0 days.

(21) Appl. No.: 18/580,355

(22) PCT Filed: Jul. 15, 2022

(86) PCT No.: PCT/EP2022/069858
§ 371 (c)(1),
(2) Date: Jan. 18, 2024

(87) PCT Pub. No.: WO2023/001702
PCT Pub. Date: Jan. 26, 2023

(65) Prior Publication Data
US 2024/0262636 A1    Aug. 8, 2024

(30) Foreign Application Priority Data
Jul. 21, 2021    (DE) ..................... 10 2021 118 923.3

(51) Int. Cl.
*G06F 7/00* (2006.01)
*B65G 13/04* (2006.01)
(Continued)

(52) U.S. Cl.
CPC ............. *B65G 43/08* (2013.01); *B65G 13/04* (2013.01); *B65G 13/065* (2013.01); *B65G 67/24* (2013.01);
(Continued)

(58) Field of Classification Search
CPC ...... B65G 43/08; B65G 13/04; B65G 13/065; B65G 67/24; B65G 2203/0225;
(Continued)

(56) References Cited

U.S. PATENT DOCUMENTS 10,625,952 B1 *   4/2020   Luthra ................. B65G 47/503
10,689,200 B1 *   6/2020   Lwali ........................ B07C 5/36
(Continued)

FOREIGN PATENT DOCUMENTS

DE    102010015584 A1    11/2011
DE    202018101313 U1    4/2018
(Continued)

OTHER PUBLICATIONS

International Search Report (Including Translation) for International Application No. PCT/EP2022/069858, mailed Oct. 26, 2022.
(Continued)

*Primary Examiner* — Yolanda R Cumbess
(74) *Attorney, Agent, or Firm* — Jason H. Vick; Womble Bond Dickinson (US) LLP (57) ABSTRACT

It is disclosed: a conveying system; an interface station; as well as a method for transferring a conveying good from a driverless transport vehicle (DTV) via an interface station, which includes a diverting conveyor unit, to a continuous conveyor operated at a preset conveying speed and comprising a preferred conveying direction, wherein the method comprises the steps of: actuatorless inertia-based delivering the conveying good from the DTV to the interface station; repeatedly detecting, by a sensor system, the delivered conveying good in an area of the interface station, while the delivered conveying good moves due to the inertia-based delivery, and generating corresponding sensor signals; based on the sensor signals, determining, by a controlling unit, a current speed and movement direction of the delivered (Continued)

conveying good; based on the current speed and movement direction, generating, by the controlling unit, a current control signal for the diverting conveyor unit such that the current speed and movement direction of the delivered conveying good are, at the latest at the time of transition of the delivered conveying good from the interface station onto the continuous conveyor, identical to the preset conveying speed and the preferred conveying direction of the continuous conveyor; and influencing a current movement of the conveying good by the diverting conveyor unit in accordance with the current control signal received by the diverting conveyor unit from the controlling unit.

24 Claims, 4 Drawing Sheets (51) Int. Cl.
*B65G 13/06* (2006.01)
*B65G 43/08* (2006.01)
*B65G 67/24* (2006.01)

(52) U.S. Cl.
CPC ............. *B65G 2203/0225* (2013.01); *B65G 2203/0233* (2013.01); *B65G 2203/025* (2013.01); *B65G 2203/041* (2013.01); *B65G 2811/095* (2013.01)

(58) Field of Classification Search
CPC ...... B65G 2203/0233; B65G 2203/025; B65G 2203/041; B65G 2811/095

USPC ......................................... 700/213, 228, 230
See application file for complete search history.

(56) References Cited

U.S. PATENT DOCUMENTS

| 2013/0037388 A1 | 2/2013 | Faist et al. |
| 2018/0004195 A1 | 1/2018 | Finke |
| 2022/0281375 A1 | 9/2022 | Behling et al. |
| 2022/0289505 A1 | 9/2022 | Behling et al. |
| 2023/0294586 A1 | 9/2023 | Behling et al. |
| 2023/0409039 A1 | 12/2023 | Behling et al. |

FOREIGN PATENT DOCUMENTS

| DE | 102019122052 B4 | 2/2021 |
| DE | 102019122055 A1 | 2/2021 |
| DE | 102020129383 B3 | 11/2021 |
| DE | 102020121883 A1 | 2/2022 |
| WO | WO 2016/082883 A1 | 6/2016 |
| WO | WO 2019/054714 A1 | 3/2019 |

OTHER PUBLICATIONS

Written Opinion for International Application No. PCT/EP2022/069858, mailed Oct. 26, 2022.
International Preliminary Report on Patentability for International Application No. PCT/EP2022/069858, mailed Feb. 1, 2024.

* cited by examiner

TRANSFER OF CONVEYING GOOD FROM INERTIA-BASED DELIVERING VEHICLE TO CONTINUOUS CONVEYOR

CROSS-REFERENCE TO RELATED APPLICATIONS

This application is a national stage application under 35 U.S.C. 371 of PCT Application No. PCT/EP2022/069858, having an international filing date of 15 Jul. 2022, which designated the United States, which PCT application claimed the benefit of German Patent Application No. 10 2021 118 923.3, filed 21 Jul. 2021, each of which are incorporated herein by reference in their entirety.

BACKGROUND

The present disclosure relates to a (hybrid) conveying system, an interface station, as well as a method for transferring conveying good from a driverless transport vehicle (DTV) via the interface station to a continuous conveyor. The hybrid conveying system is formed of discontinuous conveyors (DTVs) and continuous conveyors.

Driverless transport vehicles (DTVs), which can autonomously travel on a travelling surface of a driverless transport system (DTS) and transport the conveying goods from sources of material flow to sinks as well as deliver inertia-based to transfer stations realizing one type of sinks, are described in the documents DE 10 2019 122 055 A1 (hereinafter referred to as DE'055 A1) and DE 10 2019 122 052 B4. The Fraunhofer Institute markets such vehicles under the brand "Loadrunner". The present disclosure is applicable to such vehicles.

Figures 5A, 5B, 5C:
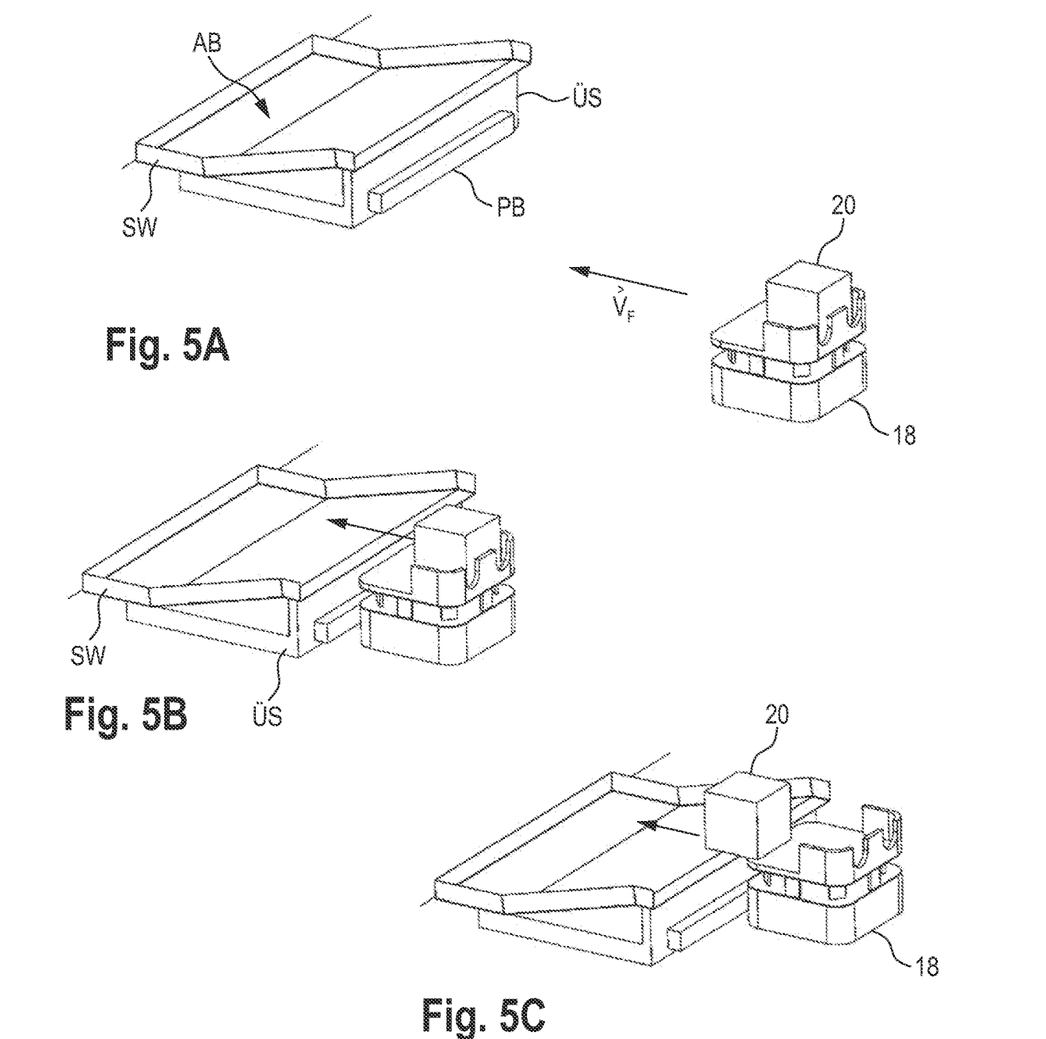
FIGS. 5A-5D show a process of an inertia-based delivery of a conveying good to a passive transfer station.
Figure 5D:
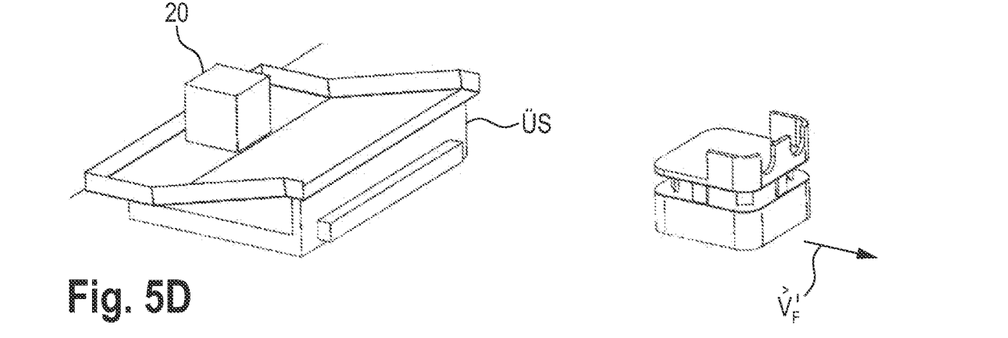

The inertia-based delivery of the conveying good, which the vehicles carry, for example, lying loose on its upper side, takes place in the manner described there, cf. FIG. 5A-D, by the vehicles abruptly changing their speed vector vF shortly before, or at the moment, the conveying goods are delivered to the transfer station ÜS so that the conveying good moves on, due to the inertia, in the original travelling direction of the vehicle from the transport surface of the vehicle into the transfer station US, cf. FIG. 5B-D. For this purpose, the vehicle can either be driven against a buffer stop PB of the transfer station ÜS in order to abruptly stop there (cf. FIGS. 5B and 5C), or abruptly change its direction briefly before reaching the transfer station in order to travel past the transfer station (not illustrated), while the conveying good follows, due to its inertia, the original movement vector (vF) of the vehicle (and of the conveying good), cf. FIGS. 5C and 5D.

The transfer station US known from DE'055 A1 is formed ramp-shaped declining and funnel-shaped, cf. FIG. 5. Receiving area AB is formed open on at least one side where the vehicle inertia-based delivers the conveying good, whereas other peripheral areas are surrounded by a circumferential sidewall SW serving as stops for the delivered conveying good.

The transfer station of DE' 055 A1 is passive. This means that the transfer station is not provided with actuators for transferring the delivered conveying good from the location, where it comes at rest at any time, to another location. The conveying goods rest in the receiving area AB of the transfer station US, cf. FIG. 5D, and need to be retrieved there manually in order to be transported further.

However, in many intralogistics applications it is necessary to transport further the delivered conveying good to a different location, in particular by continuous conveyors.

Further, it is desirable that the delivered conveying good does not tilt during the delivery, and in particular in case of being forwarded by an adjacent continuous conveyor, and thus does not change its alignment. There are conveying goods (e.g., boxes of wine), which require transportation in the standing state.

However, the inertia-based transfer is chaotic. This means that an accurate transfer location, transfer direction, and transfer speed cannot be predicted, or calculated in advance, precisely due to the inertia principle. The delivery movement starts only when the inertia force is sufficient for overcoming the static friction between the conveying good and the transportation surface of the vehicle. The inertia force depends on the amount of the speed change and on the weight of the conveying good. The direction and amount of the delivery movement are finally set only when the static friction is overcome. In this sense, the delivery is thus unpredictable and chaotic, respectively.

However, chaotic deliveries are not desired in intralogistics, in particular when the conveying good is to be forwarded to a different location via a continuous conveyor. Automatic forwarding with predetermined speed and direction, and in particular at a predetermined location with a predetermined orientation, is desirable, in particular without the conveying good tipping over and/or changing its desired orientation.

The document DE 20 2018 101 313 U1 relates to an unloading/loading station of DTVs in a intralogistics system.

The document DE 10 2020 129 383 B3 relates to vehicle and method for conveying loading units onto the vehicle.

The document DE 10 2020 121 883 A1 relates to a vehicle including a loading-good receptacle.

The document WO 2016/082 883 A1 relates to a material logistics system.

Therefore, it is an object of the present disclosure to solve the problems described above. In particular, the chaotic transfer is to be changed into a controlled forwarding.

This object is solved by a method for transferring a conveying good from a driverless transport vehicle (DTV) via an interface station, which includes a diverting conveyor unit, to a continuous conveyor operated at a preset conveying speed and comprising a preferred conveying direction, wherein the method comprises the steps of: actuatorless inertia-based delivering the conveying good from the DTV to the interface station; repeatedly detecting, by a sensor system, the delivered conveying good in an area of the interface station while the delivered conveying good moves due to the inertia-based delivery, and generating corresponding sensor signals; based on the sensor signals, determining, by a controlling unit, a current control signal and movement direction of the delivered conveying good; based on the current speed and movement direction generating, by the controlling unit, a current control signal for the diverting conveyor unit such that the current speed and movement direction of the delivered conveying good are, at the latest at the time of transition of the delivered conveying good from the interface station onto the continuous conveyor, identical to the preset conveying speed and the preferred conveying direction of the continuous conveyor; and influencing a current movement of the conveying good, by the diverting conveyor unit, in accordance with the current control signal received by the diverting conveyor unit from the controlling unit; wherein the actuatorless inertia-based delivering of the conveying good from the DTV to the interface station preferably takes place by the DTV changing abruptly its speed vector shortly before, or at the moment of, the delivery of the conveying good to the interface station so that the conveying good moves on, during the delivery due to inertia, in an original travelling direction of the DTV.

The transfer of the conveying good from the DTV to the continuous conveyor is performed dynamically. This means that the "chaotic" delivery caused by the inertia principle is converted into a controlled intake, in real time. This in turn means that the inertia-based delivered conveying good is not stopped first, in order to be subsequently delivered, but the impulse of the delivered conveying good is changed dynamically ("on the fly") in the main conveying direction of the continuous conveyor and into the preset (normal) conveying speed of the continuous conveyor.

The impulse, and the speed, of the delivered conveying good is a vectorial quantity characterized by direction and an absolute amount. The sensor system acquires information, from which the current movement direction and the current speed of the delivered conveying good can be derived, while the conveying good still moves due to the impulse transferred by the delivery. Based on the current movement speed and movement direction (actual values) the controlling unit can calculate corresponding correction values (control signals) in order to adapt these actual values to the preset conveying speed and to the preferred conveying direction (desired values) of the continuous conveyor. The adaptation is performed during the time in which the delivered conveying good is still on the interface station before the conveying good is finally delivered to the continuous conveyor. The speed and the direction are adapted at the latest at the time of transition of the conveying good from the interface station onto the continuous conveyor.

Thus, transfer time is shortened since the conveying good does not need to come at rest first before it is forwarded to the continuous conveyor.

Further, the delivered conveying goods are prevented from tipping over. The incoming energy is redirected as efficient as possible, comparable to the Chinese martial art "Wing Chun".

Preferably, the steps of determining the current speed and movement direction of the delivered conveying good, and generating the current control signal are performed in real time.

This means that the speed and direction are scanned at high rates (e.g., several hundred frames per second) and the corresponding correction signals are also generated at high rates.

Further, it is advantageous when the controlling unit further determines a current location and/or a current orientation of the delivered conveying good, which is/are additionally used for generating the current control signal, in particular for delivering the delivered conveying good in a desired orientation to the continuous conveyor.

Knowing the current location, the controlling unit can also influence a transfer point of the conveying good at an interface between the interface station and the continuous conveyor. Thus, not only the speed and the direction, but also the location of the transfer, are influenced.

The orientation of the conveying good can also be important. For certain processes in intralogistics (e.g., automated packing process using a robot) it may be necessary for the transferred conveying good to be delivered to the continuous conveyor in a predetermined orientation (e.g., narrow end face to front). The controlling unit is capable of determining the current orientation, and of outputting corresponding correction signals to the diverting conveyor unit so that the conveying good is delivered in the desired orientation to the continuous conveyor, which then transports further the conveying good to the packing robot.

Preferably, the conveying good is never at rest in the area of the interface station.

Thus, the delivery time is shortened. The throughput (transferred conveying goods per unit of time) is increased.

In particular, the sensor system generates images, which represent the sensor signals, at a preset (high) rate, wherein the current speed and movement direction, as well as preferably a current location and/or a current orientation, of the delivered conveying good are determined by means of image processing through the controlling unit.

In a further particular embodiment, the diverting conveyor unit includes a plurality of individually readable single conveyors, which are used by the controlling unit, preferably by differential measurements, for detecting the current speed and movement direction, as well as preferably a current location and/or a current orientation, of the delivered conveying good.

This means that the sensor system does not necessarily need to be implemented by a camera or lidar. Rather, the single conveyors, which are actually used as actuators, can also be used as sensors by the sensor system. When the inertia-based delivered conveying good gets in contact with one of the single conveyors, the single conveyor is driven by the delivered conveying good. This can be measured by the single conveyor. The location of the single conveyor is known to the controlling unit. In this case, the single conveyor generates a single-conveyor-specific signal (including a corresponding location and time stamp), which is caused by the delivered conveying good.

Usually, the delivered conveying good does not come in contact with one single conveyor only, but with a plurality of single conveyors so that the controlling unit can draw appropriate conclusions from the signals of the single conveyors involved about the speed and direction of the delivered conveying good. As a result, the controlling unit is capable of determining the location, the speed, the movement direction, and/or the orientation of the conveying good from this information. In particular, the orientation can be determined in case where a large number of single conveyors is present in the area of the interface station so that conclusions can be drawn from the signals of the currently involved single conveyors about the base area of the causing conveying good.

Further, the object is solved by an interface station for a DTV configured for transport of a conveying good and for an actuatorless inertia-based delivery of the conveying good, wherein the interface station comprises: a diverting conveyor unit including several single conveyors, wherein each of the single conveyors is individually drivable at a free selectable speed, and wherein each of the single conveyors preferably is rotatable about a rotation axis oriented perpendicular to a conveying plane; a sensor system configured to detect movement of the delivered conveying good on the interface station; and a controlling device configured to cause the diverting conveyor unit to redirect the conveying good, after the inertia-based delivery from the DTV while the conveying good still moves on the interface station due to the inertia-based delivery, from a current movement direction to a preferred conveying direction of a continuous conveyor which is couplable to the diverting conveyor unit, and to adapt a current speed to a preset conveying speed of the continuous conveyor.

Alternatively, the object is solved by an interface station for a DTV configured for transport of a conveying good and for an actuatorless inertia-based delivery of the conveying good, wherein the interface station comprises: a diverting conveyor unit including several single conveyors, wherein each of the single conveyors is individually drivable at a free selectable speed; a sensor system configured to repeatedly detect movement of the delivered conveying good on the interface station, while the delivered conveying good moves due to the inertia-based delivery, and to generate corresponding sensor signals; and a controlling device configured to: based on the sensor signals, determine a current speed and movement direction of the delivered conveying good in real time; and, based on the current speed and movement direction, generate a current control signal for the diverting conveyor unit in real time, in order to cause the diverting conveyor unit, in accordance with the current control signal received by the diverting conveyor unit from the controlling unit, to redirect the conveying good, after the inertia-based delivery from the DTV while the conveying good still moves on the interface station due to the inertia-based delivery at the latest at the time of transition of the delivered conveying good from the interface station onto the continuous conveyor, from the current movement direction into a preferred conveying direction of the continuous conveyor, which is couplable to the diverting conveyor unit, and adapt a current speed to a preset conveying speed of the continuous conveyor.

Such a station can achieve the same advantages, as already explained above in connection with the method.

Preferably, the sensor system includes: an image sensor, which is preferably implemented by a camera or lidar, for generating images showing the delivered conveying good and the diverting conveyor unit (at the same time) and/or the single conveyors.

In particular, the controlling unit includes an image-processing device configured to determine the current speed and movement direction, as well as preferably a current location and/or a current orientation, of the delivered conveying good based on the images of the image sensor.

Further, it is preferred to configure the diverting conveyor unit such that it can be lifted or lowered so that the single conveyors protrude, in a lifted state, beyond a conveying plane of the continuous conveyor, and are arranged, in a lowered state, at same height as the conveying plane of the continuous conveyor, or below it.

If the single conveyors are lifted, the delivered conveying good comes in contact exclusively with the diverting conveyor unit, single conveyors of which can be operated such that the speed (and direction) difference is as small as possible. Thereby, the danger of tipping over the conveying good during the transfer from the DTV to the interface station is reduced.

In the event that further continuous conveyor elements, which are preferably oriented like the continuous conveyor coupled thereto and which are in particular operated continuously at the preset speed of the continuous conveyor, are provided between the single conveyors, in turn the risk is reduced that the delivered conveying good tips over unintentionally. Interfering influences of the integrated continuous conveyor elements are avoided in the lifted state of the single conveyors.

In particular, the single conveyors are configured to be lifted and lowered individually.

Therefore, it is not necessary to lift each of the single conveyors. Rather, only such single conveyors can be lifted which are in the area which is also actually passed by the delivered conveying good. In this manner, energy can be saved. The calculation effort of the controlling unit is reduced since an individual control signal does not need to be generated for each of the single conveyors.

Further, it is advantageous if the single conveyors are arranged, preferably linearly, adjacent to each other or in a matrix-like manner.

The finer the arrangement of the single conveyors, the finer and more targeted the delivered conveying good can be acted on. This means that a great number of single conveyors is advantageous since thereby the path portions become smaller during which the conveying good can be acted on.

In particular, each of the single conveyors is a roller module as described in DE 10 2010 015 584 A1.

Further, the object is solved by a conveying system comprising: at least one DTV configured for transport of a conveying good and for an actuatorless inertia-based delivery of the conveying good, in particular by abruptly braking the DTV; an interface station of the kind described above; and a continuous conveyor coupled to the interface station.

Preferably, the continuous conveyor is selected from at least one of the following conveyor types: a roller conveyor, belt conveyor, or chain conveyor. It is understood that the above-mentioned features of the disclosure and the features of the disclosure still to be explained hereinafter cannot be used in the respectively given combination only but also in other combinations, or on their own, without departing from the scope of the invention.

BRIEF DESCRIPTION OF THE DRAWINGS

Further features and advantages of the disclosure result from the following description of preferred embodiments with reference to the figures.

DETAILED DESCRIPTION

The (hybrid) conveying system 10 proposed here is generally used in an intralogistics storage and/or picking environment, for example, in a distribution center, in a shipping center, or in a picking facility.

Intralogistics comprise the logistical flow of material and goods within a company premises, in particular within a company building. The term "intralogistics" was defined to distinguishing against transport of goods outside a company, which is carried out, for example, by a freight forwarder. The "Forum Intralogistics" in the "Association of German Machinery and Plant Manufacturers" defines the term "intralogistics" as the organization, control, implementation, and optimization of the in-house flow of goods and materials, the flow of information, as well as the handling of goods in industry, trade, or public institutions (source: Wikipedia). These definitions also apply here.

The term "order picking" refers to the compilation of a customer-specific requirement quantity from an assortment of several article types. Thus, the picking describes a picking compilation in accordance with a customer order (briefly "order"), i.e. removal of pieces of larger units of individual articles and merging and provision thereof for shipping, or for transferring to the customer within a store. The present disclosure can be used in an order-picking environment where conveying goods are to be transported from a warehouse (source) to a picking station (destination), in particular in a fixed given order (sequence).

Figure 1:
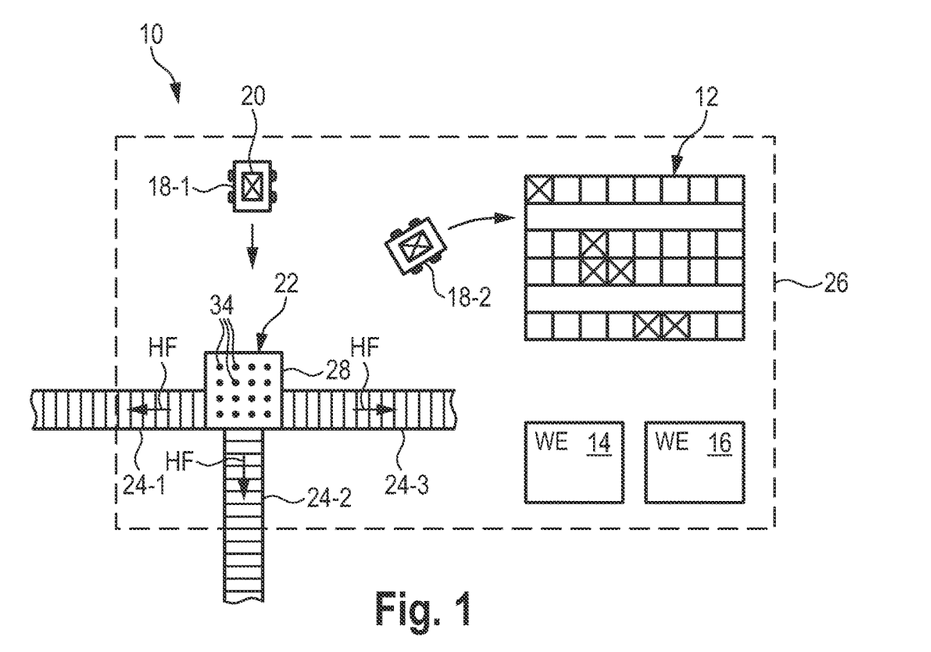
FIG. 1 shows a top view of a conveying system.

FIG. 1 shows a top view of an exemplary conveying system 10 in an intralogistics environment, which can comprise, for example, a (rack) storage area 12, a goods receipt (WE) 14, and a goods issue (WA) 16.

The conveying system 10 includes at least one (autonomous and forced-guided) driverless transport vehicle (DTV) 18 being positionable for a (lying unsecured) transport of conveying goods 20 on a transport surface, which is not designated and shown in more detail, of the DTV 18.

The DTVs 18 are configured for an actuatorless inertia-based delivery of the conveying good 20, cf. FIG. 5. The DTV 18 and the actuatorless inertia-based delivery of the conveying good 20 are exemplarily described in DE' 055 A1 mentioned in the introduction and referred to in this regard. The DTV 18 is automated. The DTV 18 can travel in forced-guided manner (cf. vehicle "Weasel" of the applicant), or autonomously. The DTVs 18 represent discontinuous conveyors.

For example, two DTV 18-1 and 18-2 are shown in FIG. 1. It is understood that at least one DTV 18 is provided. A large number of DTV 18 can be used at the same time.

The DTV 18-1 of FIG. 1 is loaded with a conveying good 20, and the DTV 18-2 is not loaded. The DTV 18-1 is on the way to an interface station 22, which will be described hereinafter in more detail and to which one or more continuous conveyors 24 can be coupled. The second DTV 18-2 travels into the storage area 12 for retrieving a new conveying good 20.

The interface station 22 is coupled to, for example, three continuous conveyors 24-1 to 24-3 in FIG. 1. The interface station 22 is coupled to at least one continuous conveyor 24.

The continuous conveyors 24 are characterized by continuous operation and are installed stationary most times. The continuous conveyors 24 are provided with a high conveying performance measured in conveyed pieces per unit of time, and produce a continuous (or quasi-continuous) conveying flow. The continuous conveyors 24 allow a variety of (fixed) lines in space and the possibility of receiving or delivering conveying goods 20 at any time. Exemplary types of continuous conveyors 24 are roller conveyors, belt conveyors, or chain conveyors. The continuous conveyors 24-1 to 24-3 of FIG. 1 are implemented, for example, as roller conveyors.

In contrast, discontinuous conveyors are single units that transport individual, or a few, conveying goods 20 from a source to a destination, and that are moved together with the conveying goods 20. Depending on the type, the discontinuous conveyor can travel to any points along a line in a (travelling) surface 26, or in space. Therefore, discontinuous conveyors such as the DTVs 18 are particularly suitable for operating many pickup points and delivery points, and bridging longer distances.

The travelling surface 26 of the DTV 18 in FIG. 1 includes the interface station 22 and preferably includes the storage area 12, the goods receipt 14, and the goods issue 16.

The interface station 22 is a material-flow interface between the DTV 18 and the at least one continuous conveyor 24. The transfer of the conveying goods 20 from the DTV 18 to the interface station 22 is performed actuatorless and inertia-based (analogous to FIG. 5). In this context actuatorless means that neither the DTV 18 nor the interface station is provided with actuators which actively move the conveying good 20 from the DTVs 18 onto the interface station 22. The transfer only takes place passively due to inertia.

Figure 2:
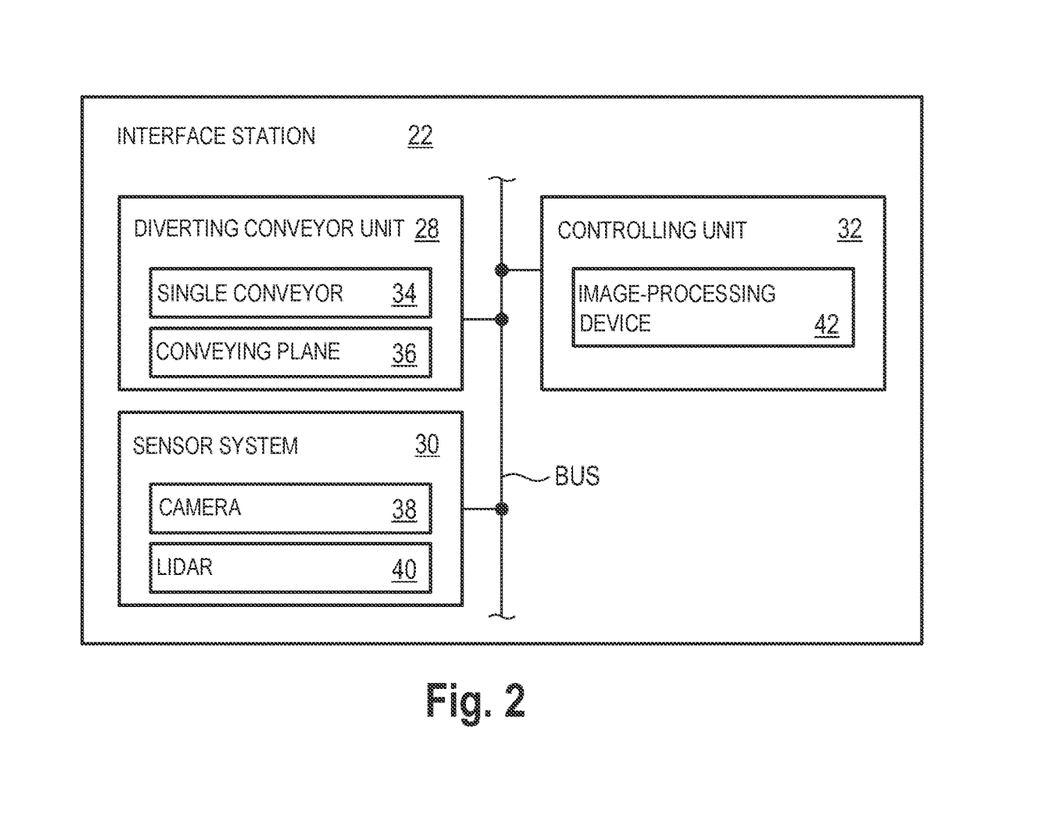
FIG. 2 shows a block diagram of an interface station.

FIG. 2 shows a block diagram of the interface station 22. The interface station 22 comprises a diverting conveyor unit 28, a sensor system 30, and a controlling unit 32. The interface station 22 is configured to receive, from one of the DTVs 18, an inertia-based delivered conveying good 20 and to deliver the same to a continuous conveyor 24 coupled thereto, wherein the delivery to the corresponding continuous conveyor 24 is performed at a speed and in a direction matching with a conveying speed and a preferred, or main, conveying direction HF, cf. FIG. 1, of the corresponding continuous conveyor 24.

The diverting conveyor unit 28 includes several single conveyors 34 defining a conveying plane 36. An exemplary diverting conveyor unit 28 is described in DE 10 2010 015 584 A1 (hereinafter referred to as DE' 584 A1), which is referred to as "matrix conveyor" there, wherein the single conveyors 34 of the present disclosure are referred to as "roller modules" there. It is understood that also different diverting conveyor units 28 can be used, such as distribution conveyor segments that are used at junctions, merging points, and intersections of continuous conveyors in order to convert an input conveying movement into an output conveying movement.

The single conveyors 34 are arranged distributed, preferably uniform, over an upper side of the interface station 22. The single conveyors 34 are arranged such that, independent of a delivery direction and delivery speed which are chaotic in the above-mentioned sense, one can act on the delivered conveying goods 20 for transferring the delivered conveying goods 20 into a controlled movement adapted to the parameters (at least direction and speed) of the continuous conveyor 24.

Each of the single conveyors 34 can be operable at a free selectable speed. Each of the single conveyors 34 can be controlled individually. Each of the single conveyors 34 is preferably rotatable about its (own) rotation axis being oriented perpendicularly to the conveying plane 36. The conveying plane 36 is planar and defined by the upper side of the single conveyors 34 (cf. FIG. 3). The individual conveyors 34 can be rotatable for actively changing a current movement direction of a delivered conveying good 20. Alternatively, the single conveyors, which have differently aligned basic conveying directions, can be distributed over the surface of the diverting conveyor unit 28, as shown in DE' 584 A1.

The controlling unit 32 is configured to cause the diverting conveyor unit 28 to redirect the conveying good 20, after the inertia-based delivery from the DTV 18 while the conveying good 20 still moves on the interface station 22 due to the inertia-based delivery, from the current movement direction into a preferred conveying direction of the corresponding continuous conveyor 24, and to adapt a current speed of the delivered conveying good 20 to a preset conveying speed of the corresponding continuous conveyor. The controlling unit 32 includes a data-processing device including a processor and memory where programs are stored, which are used by the processor for calculating the current speed and direction. Image-processing programs can also be stored there.

The sensor system 30 can comprise an image sensor such as a camera 38 (2D image) or lidar 40 (3D image). The image sensor is configured to generate images including at least the delivered conveying good 20 and the diverting conveyor unit 28. Preferably, the field of view of the image sensor can also include an approaching area of the DTV 18. The approaching area includes the immediate interface between the interface station 22 and the travelling surface 26 as well as an end area of the travelling path of the DTV 18 before the conveying good 20 is delivered inertia-based to the interface station 22. In this manner the direction and speed of the DTV 18 (and thus also of the conveying good 20) can be at least verified, and preferably also determined.

Alternatively or additionally, the sensor system 30 can also include the single conveyors 34.

Further, the sensor system 30 can include an array of light scanners and/or light barriers (not shown) monitoring the upper side of the interface station.

The sensor system 30 supplies data in terms of signals from which a current location, a current speed, a current movement direction, and/or a current orientation of the conveying good 20 are derivable.

When the sensor system 30 is implemented by an image sensor, the image sensor delivers (with a predetermined sampling rate) (still) images, or frames, being two dimensional or three dimensional and provided respectively with a corresponding time stamp. A chronological sequence of these images illustrates the movement of the delivered conveying good 20. The location, the movement direction, the speed, and the orientation of the conveying good can be determined (in real time) by means of image processing from the sequence of these images.

Therefore, in this case the controlling unit 32 includes an image-processing device 42. The image-processing device 42 is configured to determine at least the current speed and movement direction, as well as preferably the current location and/or a current orientation, based on the images from the image sensor.

However, the current speed and movement direction of the delivered conveying good 20 can also be determined differently. For example, the single conveyors 34, which are actually actuators of the diverting conveyor unit 28, can also be used as sensors. The conveying good 20 delivered by the DTV 18 moves due to inertia over the single conveyors 34, which are driven by it. If each of the single conveyors 34 can be read individually, i.e. can send individual signals to the controlling unit 32 representing the movement of the delivered conveying good 20, the controlling unit 32 can derive from it at least the current speed and movement direction of the delivered conveying goods. This presupposes that the controlling unit 32 knows the locations of the respective single conveyors 34 and that the signals of the single conveyors 34 are provided with corresponding location and time stamps.

It is understood that the interface station 22 can be generally configured to handle a plurality of delivered conveying goods 20 at the same time.

The diverting conveyor unit 28 can be configured to be lifted and lowered so that the single conveyors 34 protrude, in a lifted state, beyond a conveying plane of the continuous conveyor 24 and are arranged, in a lowered state, at same height as the conveying plane of the continuous conveyor 24, or below it. In particular, the single conveyors 34 can be lifted and lowered individually. The single conveyors 34 can be directly adjacent, or arranged spaced and distributed, e.g., in a matrix-like manner. When the single conveyors 34 are arranged, preferably linear, adjacent to each other, they can replace, for example, individual rollers of a conventional roller conveyor in terms of a module, cf. FIG. 3. The matrix-like distribution is exemplarily shown in DE' 584 A1.

Figure 3:
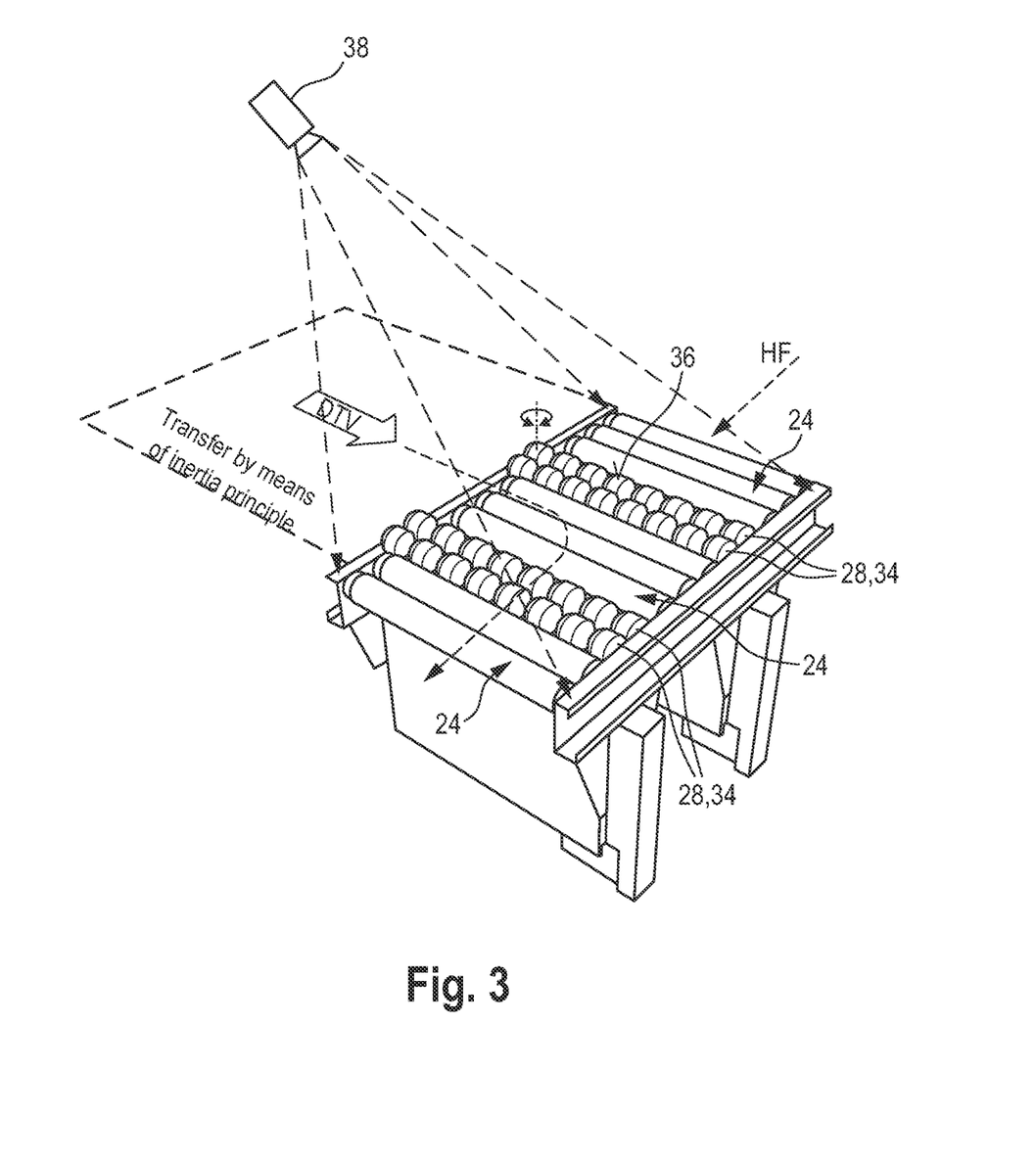
FIG. 3 shows a perspective view of an interface station.

FIG. 3 shows a perspective view of an exemplary interface station 22 in an isolated illustration. The interface station 22 of FIG. 3 comprises a diverting conveyor unit 28 including four modules of single conveyors 34, which in turn are arranged, for example, linear adjacent for replacing one or more rollers of a conventional roller conveyor. Thus, the interface station 22 of FIG. 3 also comprises, besides the diverting conveyor unit 28 consisting of the four modules, conventional rollers operated in the preferred conveying direction HF.

In FIG. 3 the (not illustrated) DTV 18 deliver their (not illustrated) conveying goods 20 inertia-based to the interface station 22 by the DTVs abutting laterally against the open side of the interface station 22, so that the conveying good 20 is transferred inertia-based onto the conveying plane 36, which is defined in this case by the diverting conveyor unit 28 and the conventional rollers.

The sensor system 30 illustrated in FIG. 3, to which the camera 38 belongs, detects the delivered conveying good 20 in the area of the interface station 22 while the conveying good 20 (still) moves due to the inertia-based delivery, and generates corresponding sensor signals, which are delivered to the controlling unit 32 (not illustrated) for determining, based on the sensor signals, the current speed and movement direction of the delivered conveying good 20 by calculation.

The detection, generation, and determination take place in real time. This means that the delivered conveying good 20 is still in movement, and thus does not come at rest, while the diverting conveyor unit 28 already acts on the delivered conveying good 20 such that the delivered conveying good is adapted in movement direction and movement speed to the direction and speed of the receiving continuous conveyor 24. Thus, the conveying good 20 is dynamically redirected, or transferred, from the DTV 18 via the interface station 22 to the receiving continuous conveyor 24 (not illustrated in FIG. 3). This redirection takes place independently from the delivery speed and delivery direction of the conveying good 20 which is delivered by the DTV 18 in accordance with the inertia principle to the interface station 22. The transfer from the DTV 18 to the continuous conveyor 24 takes place automatically and continuously, i.e. without delay and pause.

Figure 4:
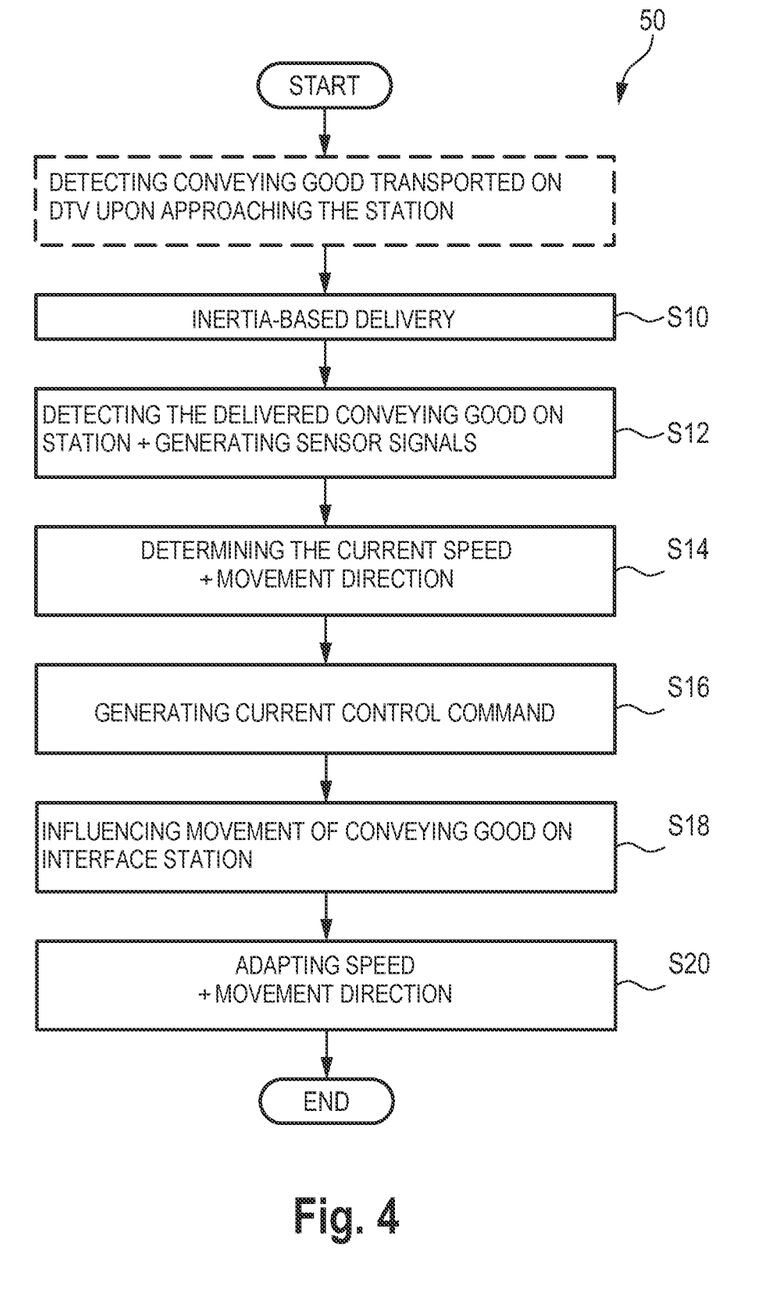
FIG. 4 shows a flow chart of a method for transferring a conveying good from a vehicle onto a continuous conveyor.

In FIG. 4 a flow chart of a method 50 for transferring a conveying good 20 from one of the DTVs 18 via the interface station 22 to a continuous conveyor 24 is shown, which is operated at a preset conveying speed and has a preferred conveying direction (HF in FIG. 1).

The method 50 comprises several steps, which are performed preferably subsequently in the given order.

In first step S10 the DTV 18 delivers the conveying good 20 in an actuatorless and inertia-based manner to the interface station 22. Additionally, the approaching DTV 18 can optionally also be detected, as mentioned above.

In second step S12 the delivered conveying good 20 is (repeatedly) detected by the sensor system 30 in the area of the interface station 22, while the conveying good 20 (still) moves due to the inertia-based delivery, and corresponding sensor signals are generated, which are transmitted to the controlling unit 32, preferably via a data bus, cf. FIG. 2.

In step S14 of FIG. 4 at least (temporal) current speed and movement direction of the delivered conveying good 20 are determined by the controlling unit 32 based on the sensor signals. The current speed and movement direction are preferably determined by means of image processing. Additionally, also the current location and/or the current orientation of the delivered conveying good 20 can be determined correspondingly.

In step S16, based on the current speed and movement direction, the controlling unit 32 generates a current control signal for the diverting conveyor unit 28 such that the current speed and movement direction of the delivered conveying good are, at the latest at the time of a transition of the delivered conveying good from the interface station 22 onto the continuous conveyor 34, identical to the preset conveying speed and the preferred conveying direction of the continuous conveyor 34.

Thus, in step S20 the current speed and movement direction of the delivered conveying good 20 are equal to the preset conveying speed of the continuous conveyor 34 and to the preferred conveying direction of the continuous conveyor 34.

After that, the method ends.

FIG. 5 illustrates the inertia-based delivery of the conveying good 20 to a passive conventional transfer station ÜS; as already described in the introduction.

It is understood that several stations 22 can also be arranged (directly) next to each other for defining multiple transfer points to the same continuous conveyor 34. In this manner, the transfer performance can be increased. In addition, the delivered conveying goods 20 can also be sequenced in this manner, i.e. the location of the delivery influences an (absolute) sequence of the conveying goods 20 on the continuous conveyor 34.

LIST OF REFERENCE NUMERALS 10 conveying system
12 (rack) storage area
14 goods receipt (WE)
16 goods issue (WA)
18 DTV
20 conveying good
22 interface station
24 continuous conveyor
26 (travelling) surface
28 diverting conveyor unit
30 sensor system
32 controlling unit
34 single conveyor
36 conveying plane
38 camera
40 lidar
50 method

The invention claimed is:

1. A method for transferring a conveying good from a driverless transport vehicle, (DTV), via an interface station, which includes a diverting conveyor unit, to a continuous conveyor, which is operated at a preset conveying speed and comprises a preferred conveying direction, wherein the method comprises the steps of:
actuatorless inertia-based delivering the conveying good from the DTV to the interface station;
repeatedly detecting, by a sensor system, the delivered conveying good in an area of the interface station while the delivered conveying good moves due to the inertia-based delivery, and generating corresponding sensor signals;
based on the sensor signals, determining, by a controlling unit, a current speed and movement direction of the delivered conveying good;
based on the current speed and movement direction, generating, by the controlling unit, a current control signal for the diverting conveyor unit such that the current speed and movement direction of the delivered conveying good are identical, at the latest at the time of transition of the delivered conveying good from the interface station onto the continuous conveyor, to the preset conveying speed and the preferred conveying direction of the continuous conveyor; and
influencing a current movement of the conveying good by the diverting conveyor unit in accordance with the current control signal received by the diverting conveyor unit from the controlling unit.

2. The method of claim 1, wherein the steps of determining the current speed and movement direction of the delivered conveying good and of generating the current control signal are performed in real time.

3. The method of claim 1, wherein the controlling unit further determines, based on the sensor signals, at least one of a current location or a current orientation of the delivered conveying good, which is additionally used for generating the current control signal for delivering the delivered conveying good in a desired orientation to the continuous conveyor.

4. The method of claim 1, wherein the conveying good is never at rest in the area of the interface station.

5. The method of claim 1, wherein the sensor system generates images, which represent the sensor signals, at a preset rate, and wherein the current speed and movement direction of the delivered conveying good are determined by means of image processing through the controlling unit.

6. The method of claim 1, wherein the diverting conveyor unit includes a plurality of individually readable single conveyors, which are used by the controlling unit for detecting the current speed and movement direction of the delivered conveying good.

7. An interface station for a driverless transport vehicle, DTV, configured for transport of a conveying good and for an actuatorless inertia-based delivery of the conveying good, wherein the interface station comprises:
a diverting conveyor unit including several single conveyors, wherein each of the single conveyors is individually drivable at a free selectable speed, and wherein each of the single conveyors preferably is rotatable about a rotation axis oriented perpendicular to a conveying plane;
a sensor system configured to detect movement of the delivered conveying good on the interface station; and
a controlling device configured to cause the diverting conveyor unit to redirect the conveying good, after the inertia-based delivery from the DTV while the conveying good still moves on the interface station due to the inertia-based delivery, from a current movement direction to a preferred conveying direction of a continuous conveyor, which is couplable to the diverting conveyor unit, and to adapt a current speed to a preset conveying speed of the continuous conveyor.

8. The interface station of claim 7, wherein the sensor system includes at least one of:
an image sensor for generating images showing the delivered conveying good and the diverting conveyor unit, or
the single conveyors.

9. The interface station of claim 8, wherein the controlling unit includes an image-processing device configured to determine the current speed and movement direction of the delivered conveying good based on images of the image sensor.

10. The interface station of claim 7, wherein the diverting conveyor unit is configured to be lifted and lowered so that the single conveyors protrude, in a lifted state, beyond a conveying plane of the continuous conveyor and are arranged, in a lowered state, at same height as the conveying plane of the continuous conveyor, or below it.

11. The interface station of claim 10, wherein the single conveyors are configured to be lifted and lowered individually.

12. The interface station of claim 7, wherein the single conveyors are arranged at least one of adjacent to each other or in a matrix-like manner.

13. The interface station of claim 7, wherein each of the single conveyors is a roller module.

14. A conveying system, comprising:
 at least one driverless transport vehicle, DTV, configured for transport of a conveying good and configured for an actuatorless inertia-based delivery of the conveying good;
 an interface station configured for transport of a conveying good and for an actuatorless inertia-based delivery of the conveying good, wherein the interface station comprises:
 a diverting conveyor unit including several single conveyors, wherein each of the single conveyors is individually drivable at a free selectable speed;
 a sensor system configured to repeatedly detect movement of the delivered conveying good on the interface station while the delivered conveying good moves due to the inertia-based delivery, and to generate corresponding sensor signals; and
 a controlling device configured to:
 based on the sensor signals, determine a current speed and movement direction of the delivered conveying good; and
 based on the current speed and movement direction, generate a current control signal for the diverting conveyor unit in real time, in order to cause the diverting conveyor unit, in accordance with the current control signal received by the diverting conveyor unit from the controlling unit, to redirect the conveying good, after the inertia-based delivery from the DTV while the conveying good still moves on the interface station due to the inertia-based delivery, at the latest at the time of transition of the delivered conveying good from the interface station onto the continuous conveyor, from the current movement direction to a preferred conveying direction of the continuous conveyor, which is couplable to the diverting conveyor unit, and to adapt a current speed to a preset conveying speed of the continuous conveyor; and
 a continuous conveyor coupled to the interface station.

15. The conveying system of claim 14, wherein the continuous conveyor is selected from at least one of the following conveyor types: roller conveyor, belt conveyor, or chain conveyor.

16. The method of claim 3, wherein at least one of the current location or the current orientation of the delivered conveying good is additionally used for delivering the delivered conveying good in a desired orientation to the continuous conveyor.

17. The method of claim 5, wherein further at least one of a current location or a current orientation of the delivered conveying good is determined by image processing through the controlling unit.

18. The method of claim 6, wherein the plurality of individually readable single conveyors is used by the controlling unit by differential measurements, for detecting the current speed and movement direction.

19. The method of claim 6, wherein the plurality of individually readable single conveyors is used by the controlling unit for further detecting at least one of a current location or a current orientation of the delivered conveying good.

20. The interface station of claim 7, wherein each of the single conveyors is rotatable about a rotation axis oriented perpendicular to a conveying plane.

21. The interface station of claim 8, wherein the image sensor is implemented by a camera or lidar.

22. The interface station of claim 9, wherein the image-processing device is configured to further determine at least one of a current location or a current orientation of the delivered conveying good based on the images of the image sensor.

23. The interface station of claim 12, wherein the single conveyors are arranged linearly adjacent to each other.

24. The conveying system of claim 14, wherein the DTV is configured for an actuatorless inertia-based delivery of the conveying good by abruptly braking the DTV.

* * * * *